US010085219B2

(12) United States Patent
Hessler et al.

(10) Patent No.: US 10,085,219 B2
(45) Date of Patent: Sep. 25, 2018

(54) POWER CONTROL IN A WIRELESS NETWORK

(71) Applicant: Telefonaktiebolaget L M Ericsson (publ), Stockholm (SE)

(72) Inventors: Martin Hessler, Linköping (SE); Jonas Fröberg Olsson, Ljungsbro (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 14/900,520

(22) PCT Filed: Nov. 16, 2015

(86) PCT No.: PCT/EP2015/076686

§ 371 (c)(1),
(2) Date: Dec. 21, 2015

(87) PCT Pub. No.: WO2017/084692

PCT Pub. Date: May 26, 2017

(65) Prior Publication Data

US 2018/0035389 A1 Feb. 1, 2018

(51) Int. Cl.
*H04W 52/24* (2009.01)
*H04W 52/46* (2009.01)

(52) U.S. Cl.
CPC ......... *H04W 52/245* (2013.01); *H04W 52/46* (2013.01)

(58) Field of Classification Search
CPC .......................................... H04W 52/04–52/60
See application file for complete search history.

(56) References Cited

U.S. PATENT DOCUMENTS

| | | | |
|---|---|---|---|
| 8,331,975 B2 | 12/2012 | Lin et al. | |
| 8,559,999 B2 | 10/2013 | Hu et al. | |
| 8,571,468 B2 | 10/2013 | Hart | |
| 8,700,084 B2 | 4/2014 | Pelletier et al. | |
| 9,083,433 B2 | 7/2015 | Ode et al. | |
| 2004/0001464 A1 | 1/2004 | Adkins et al. | |
| 2004/0162101 A1 | 8/2004 | Kim et al. | |
| 2010/0034177 A1 | 2/2010 | Santhanam et al. | |
| 2011/0034206 A1* | 2/2011 | Venkatraman ....... | H04B 7/0452 455/522 |
| 2012/0033629 A1 | 2/2012 | Yajima et al. | |

(Continued)

OTHER PUBLICATIONS

3GPP, "Technical Specification Group Radio Access Network; Evolved Universal Terrestrial Radio Access (E-UTRA); Radio Resource Control (RRC); Protocol specification (Release 11)", 3GPP TS 36.331 V11.0.0, Jun. 2012, 1-296.

(Continued)

*Primary Examiner* — Raymond Dean
(74) *Attorney, Agent, or Firm* — Murphy, Bilak & Homiller, PLLC

(57) ABSTRACT

A method for power control in a wireless network is performed in a first node in the wireless network and comprises the steps of: estimating a received power spectral density from a second node in the wireless network; determining a target received power spectral density from a third node in the wireless network, in dependence of the estimated received power spectral density; and sending power control information to the third node in dependence on the determined target received power spectral density.

20 Claims, 5 Drawing Sheets

(56) References Cited

U.S. PATENT DOCUMENTS

| | | | | |
|---|---|---|---|---|
| 2013/0194953 | A1 | 8/2013 | Xu et al. | |
| 2014/0066119 | A1 | 3/2014 | Tavildar et al. | |
| 2014/0198664 | A1 | 7/2014 | Chen et al. | |
| 2015/0264651 | A1 | 9/2015 | Shi et al. | |
| 2017/0055229 | A1* | 2/2017 | Klockar | H04W 52/146 |

OTHER PUBLICATIONS

Halabian, Hassan et al., "Optimal Joint Resource Allocation and Power Control in Bidirectional Relaying Networks", IEEE Transactions on Vehicular Technology, vol. 63, No. 9, Nov. 2014, 1-16.

* cited by examiner

POWER CONTROL IN A WIRELESS NETWORK

TECHNICAL FIELD

The invention relates to a method for power control in a wireless network, and a network node, a user equipment, a computer program and a computer program product therefor.

BACKGROUND

In a wireless network a radio receiver is a function in a radio node for receiving radio transmissions from one or multiple radio transmitters. One of the most important and most fundamental problems in a wireless network is to set the output power of the radio transmitters. In many wireless networks, for example a Long-Term Evolution, LTE, network, the radio links have a downlink, DL, and an uplink, UL, where a DL is a transmission from an enhanced NodeB, eNB, that also schedules the radio link and a UL is a transmission from a User Equipment, UE, scheduled from an eNB.

Typically, an eNB uses a determined output power in both UL and DL radio links from and to a UK The DL-power has often a fixed power spectral density according to the maximal power. The UL-power is then determined by that the eNB transmits a DL reference signal that the UEs measure and adapt their output power in order to make the received power of all UL transmissions to be more or less the same at the eNB. Sometimes, an eNB allows for adjustment for e.g. measurement errors in which the eNB transmits so called transmit power control, TPC, commands to UEs to adjust the power.

In LTE, power control is applied for uplink physical channels. The aim for the power control is to maintain a target received power at the receiving base station (Enhanced NodeB, eNB). For the uplink data channel, Physical Uplink Shared Channel, PUSCH, the transmitted power by a User Equipment, UE, in a subframe i is determined by the formula:

$$P_{PUSCH}(i)=\min\{P_{CMAX},10\log_{10}(M_{PUSCH}(i))+P_{O\_PUSCH}(j)+\alpha(j)\cdot PL+\Delta_{TF}(i)+f(i)\}$$

$P_{CMAX}(i)$ is the configured maximum UE transmit power, $M_{PUSCH}(i)$ is the number of resource blocks allocated for the UE, $P_{O\_PUSCH}(j)$ is a parameter consisting of the sum of a cell-specific and a UE-specific part provided by higher layers, $\alpha$ is cell-specific parameter configured by higher layers (also known as fractional path loss compensation factor), PL is the UL path loss estimate calculated in the UE, $\Delta_{TF}(i)$ is a UE-specific parameter provided by higher layers and f (i) is a UE-specific correction term controlled by transmit power control, TPC, commands sent in UL grants sent on the Physical Downlink. Control Channel, PDCCH. For later releases of the Third Generation Partnership Project, 3GPP, specifications the power control is slightly more complicated due to the support of multi-carrier where a UE can support multiple serving cells.

Technical Specifications, TS, for power control are described in versions of 3GPP TS36.331, "Evolved Universal Terrestrial Radio Access (E-UTRA); Radio Resource Control (RRC) protocol specification". Power control arrangements of the type outlined above may be found in versions under Release 11 and higher.

SUMMARY

It is an object of the invention to improve power control in a wireless network, particularly in a wireless multi-hop network.

According to a first aspect, it is presented a method for power control in a wireless network. The method is performed in a first node in the wireless network and comprises the steps of: estimating a received power spectral density from a second node in the wireless network; determining a target received power spectral density from a third node in the wireless network, in dependence of the estimated received power spectral density; and sending power control information to the third node in dependence on the determined target received power spectral density. By setting up the second node and the third node to transmit at power levels being received at similar power spectral densities at the first node, it may be possible to receive transmissions from both the second node and the third node simultaneously, e.g. in a common time interval, such as one scheduling unit of the wireless network.

The step of estimating a received power spectral density may include the steps of measuring a received power from the second node, estimating a path gain between the second node and the first node, and determining a received power spectral density from the second node in dependence of the measured received power, the estimated path gain and a bandwidth.

The step of determining a second received power spectral density may set the target received power spectral density to the estimated received power spectral density within thresholds, wherein the thresholds may be set in dependence of processing capabilities of the first node.

The method may comprise a further step of modifying the determined target received power spectral density, and wherein power control information is in dependence on the modified determined target received power spectral density. By modifying the target received power spectral density cancelling and/or suppressing interference from one transmitter is possible.

The method may comprise a further step of sending power control adjustment information to the second node and/or to the third node.

The method may be performed for a Transmission Time Interval, TTI such that both a received transmission from a second node and a received transmission from a third node are received within one single TTI.

The step of sending may be performed via a broadcast message.

The power control information may specify a setpoint value in terms of the determined target received power spectral density. A setpoint value may alternatively be referred to as a target value.

According to a second aspect, it is presented a network node for power control in the wireless network. The network node is a first node in a wireless network, wherein the network node comprises: a processor; and a computer program product storing instructions that, when executed by the processor, causes the network node to; estimate a received power spectral density from a second node in the wireless network; determine a target received power spectral density from a third node in the wireless network, in dependence of the estimated received power spectral density; and send power control information to the third node in dependence on the determined target received power spectral density. By setting up the second node and the third node to transmit at power levels being received at similar power spectral densities at the first node, it may be possible to receive transmissions from both the second node and the third node simultaneously, e.g. in a common time interval, such as one scheduling unit of the wireless network.

According to a third aspect, it is presented a User Equipment, UE, for power control in the wireless network. The UE is a first node in a wireless network, wherein the UE comprises: a processor; and a computer program product storing instructions that, when executed by the processor, causes the UE to: estimate a received power spectral density from a second node in the wireless network; determine a target received power spectral density from a third node in the wireless network, in dependence of the estimated received power spectral density; and send power control information to the third node in dependence on the determined target received power spectral density.

According to a fourth aspect, it is presented a network node for power control in a wireless network. The network node comprises: a determination manager configured to estimate a received power spectral density from a second node in the wireless network, and to determine a target received power spectral density from a third node in the wireless network, in dependence of the estimated received power spectral density; and a communication manager configured to send power control information to the third node in dependence on the determined target received power spectral density.

According to a fifth aspect, it is presented a User Equipment, UE, for power control in a wireless network. The UE comprises: a determination manager configured to estimate a received power spectral density from a second node in the wireless network, and to determine a target received power spectral density from a third node in the wireless network, in dependence of the estimated received power spectral density; and a communication manager configured to send power control information to the third node in dependence on the determined target received power spectral density.

According to a sixth aspect, it is presented a computer program for power control in a wireless network. The computer program comprises computer program code which, when run on a processor of a first network node in the wireless network, causes the first network node to: estimate a received power spectral density from a second node in the wireless network; determine a target received power spectral density from a third node in the wireless network, in dependence of the estimated received power spectral density; and send power control information to the third node in dependence on the determined. target received power spectral density.

According to a seventh aspect, it is presented a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which.

DETAILED DESCRIPTION

The invention will now be described more fully hereinafter with reference to the accompanying drawings, on which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description and drawings.

In current state of the aid solutions for multi-hop radio networks, such as a Long-Term Evolution, LTE, relay, the radio links are time separated. For a multi-hop LTE network meaning that a self-backhauled node B, such as an indoor/street-level Pico node, can only transmit either to its master node A, such as a donor Enhanced NodeB, eNB, or to its slave nodes such as User Equipments, UEs. Hence each Transmission Time Interval, TTI, is in a LTE network not optimally utilized and the latency is limited by the preassigned switching subframe structure. One reason for this is that the received power from the master node A, e.g. a 40 W macro eNB, can be very different than the received power from the slave nodes $C_i$ e.g. 0.2 W UEs. Contrary to intuition the received power from the slave nodes $C_i$ can potentially be much higher than the received power from the macro eNB, due to that the slave nodes $C_i$ typically are very close to the self-backhauled node B while the self-backhauled node B has a long, bad propagation path to the master node A. Poor coverage in a location typically justifies a decision to locate a pico node there.

The same situation can also be for Device-to-Device, D2D, UEs where one UE B relays information to close-by UEs $C_i$. This is often referred to as a sidelink.

A new power control for a wireless network is thus presented that e.g. allows full-duplex operation also in multi-hop radio networks with intermittent transmissions. Full-duplex operation can be provided, without very high requirements of the radio receivers to handle very large differences in received power. Put differently, a radio receiver with a modest dynamic range may perform satisfactory. The latency in a multi-hop radio network can thus be reduced significantly, down to half, when it is possible to transmit in opposite directions at each TTI.

Figure 1:
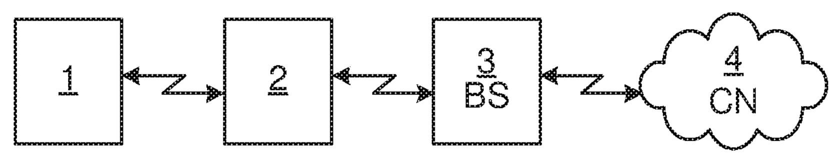
FIG. 1 is a schematic diagram illustrating an environment where embodiments presented herein can be applied.

A wireless network environment wherein the embodiments described herein can be implemented is presented in FIG. 1. A third node 1 is wirelessly connected to a first node 2. The third node 1 acts as slave in relation to the first node 2. The first node 2 is in turn wirelessly connected to a second node 3, in relation to the first node 2. The second node 3 is acting as a base station, BS, and is connected to a core network, CN, 4.

Figure 2:
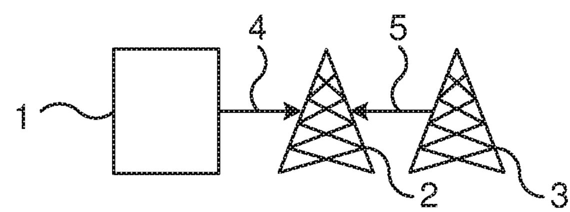
FIGS. 2, 3A and 3B are schematic diagrams illustrating embodiments presented herein.

An embodiment will now be presented with reference to FIG. 2. The first node 2 acts as both a master and a slave in relation to the other nodes 1 and 3. The first node 2 estimates a received power spectral density 5 from the second node 3, for which the first node 2 acts as a slave. The first node 2 configures its own third node 1, acting as a second, with a target received power spectral density 4 in such a way that the received powers from the second node 3 and the third node 1 are similar, preferably within thresholds. The thresholds may be set in dependence of processing capabilities, e.g. a dynamic range, of the first node 2. A UE may e.g. be able to handle about 6 dB difference in received power spectral densities, whereas a base station may e.g. be able to handle about 20 dB difference in received power spectral densities.

The transmit power from the third node i is thus set such that the received power spectral densities $g_A P_A/BW_A$ and $g_C P_C/BW_C$ are similar at the first node 2, or at least within the dynamic range the first node 1 can handle. $g_A$ is the path-gain from the second node 3 to the first node 2, including the transmit antenna gain. $P_A$ is the transmit power form the second node 3, and $BW_A$ is the bandwidth received from the second node 3. $g_C$ is the path loss from the third node 1 to the first node 2, including the transmit antenna gain. $P_C$ is the transmit power from the third node 1, and $BW_C$ is the bandwidth received from the third node 1.

The first node 2 may estimate the path loss from the second node 3 as the received power equal to path loss times power. The second node 3 may transmit a reference signal that is available for measurements, such as cell-specific reference signals, CRS, that the first node 2 can measure received power on. Information of the transmit power from the second node 3 may e.g. be obtained from the reference signal.

In a similar manner, a sidelink synchronization signal from the first node 2 may be used by the third nodes 1 to estimate the path loss therebetween, provided that first node 2 announces its transmission power, the transmission power is pre-agreed or known by other means. The first node 2 may announce its transmission power via its broadcast message SL-BCCH (sidelink-Broadcast Control Channel), which is used to broadcast node/device-specific information that a receiver can decode.

When no reference signal is available for measurements, or for some other reason when a reference signal is not suitable for path-gain estimation, control or data signals may contain an information field indicating the used transmit power, e.g. a MAC (Media Access Control) control element. The transmit power is then used for path-gain estimation on dedicated transmissions. The transmit power is then used for path-gain estimation on dedicated transmissions.

Figure 3A:
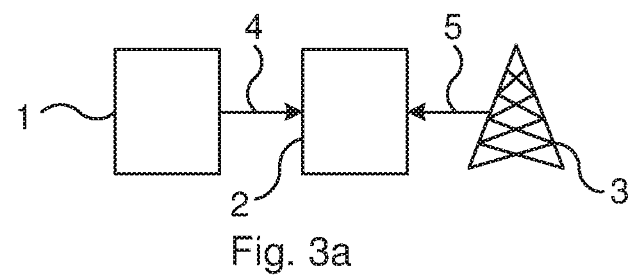

The first node 2 may e.g. be an eNB. A relay UE capable of providing network access for one or more UEs is also presented, which is illustrated in FIG. 3A. The term network node is thus to be functionally interpreted as a node in the access network, in such a way that a UE working as a D2D is functionally to be considered a network node.

Figure 3B:
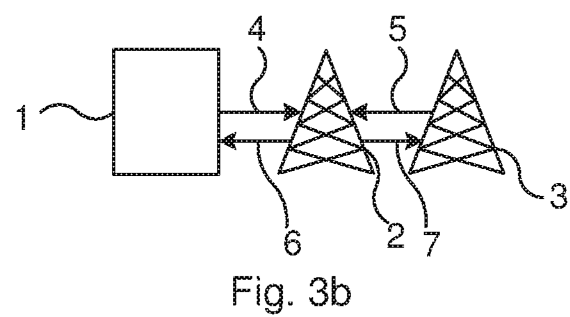

The first node 2 may support full duplex, which is illustrated in FIG. 3B. Transmission 6 from the first node 2 to the third node 1 and simultaneous transmission 7, i.e. within the same TTI, from the first node 2 to the second node 3, may be provided in a conventional manner because received powers are now compatible. In this way, the first node 1 may simultaneously both receive 4, 5 and transmit 6, 7 to the second and third nodes 2, 3, i.e. within the same TTI.

Even though only one third node 1 has been illustrated on the drawings, the first node 2 will typically serve a plurality of third nodes $C_k$.

The first node 2 can, due to the two received power spectral densities being similar, receive downlink, DL, transmissions form the second node 3 in the same it receives uplink, UL, transmissions from the third node(s) 1. The transmit power rule, which is applied from a third node 3, may be similar to an open loop uplink power control in Evolved-Universal Terrestrial Access Network, E-UTRAN:

$$P_{CkB}(i)=\min\{P_{CMAX},\ 10\log_{10}(M_{CkB}(i))+P_{O\_CkB}(j)+\alpha(j)\cdot PL_{CkB}\}$$

For i=1, $P_{CMAX}$ is the configured maximum transmit power of third node 1 ($C_k$), $M_{CkB}(i)$ is the number of resource blocks transmitted by third node 1 ($C_k$) to first node 2 (B), $P_{O\_CkB}(j)$ is the power target for transmissions from the third node 1($C_k$) to first node 2 (B), α is an optional parameter configured by higher layers (also known as fractional path loss compensation factor), $PL_{CkB}$ is the path loss estimate for the link from third node 1 ($C_k$) to first node 2 (B) based on the estimated path loss for the link from first node 2 (B) to third node 1 ($C_k$). This estimate may in a variant be provided based on the transmission of the determined target received power spectral density sent from first node 2 (B) to third node 1 ($C_k$).

in one variant the first node 2 is capable of cancelling and/or suppressing interference from one transmitter while decoding a signal from a different transmitter, typically cancelling and/or suppressing signals from a third node 1 to prioritize signals from the second and node 3. This enables the receiver in the first node 2 to avoid parts of the interference. When supported by such capabilities, the capability can be represented by a suppression factor S. The first node 2 may then modify the estimated received power spectral density from the second node 3 by the suppression factor S, either adding or subtracting in log scale, or multiplying or dividing in linear scale, before sending the modified determined target received power spectral density to the third nodes 1. These capabilities are typically a function of receiver type, receiver hardware and number of antenna elements.

Figure 4:
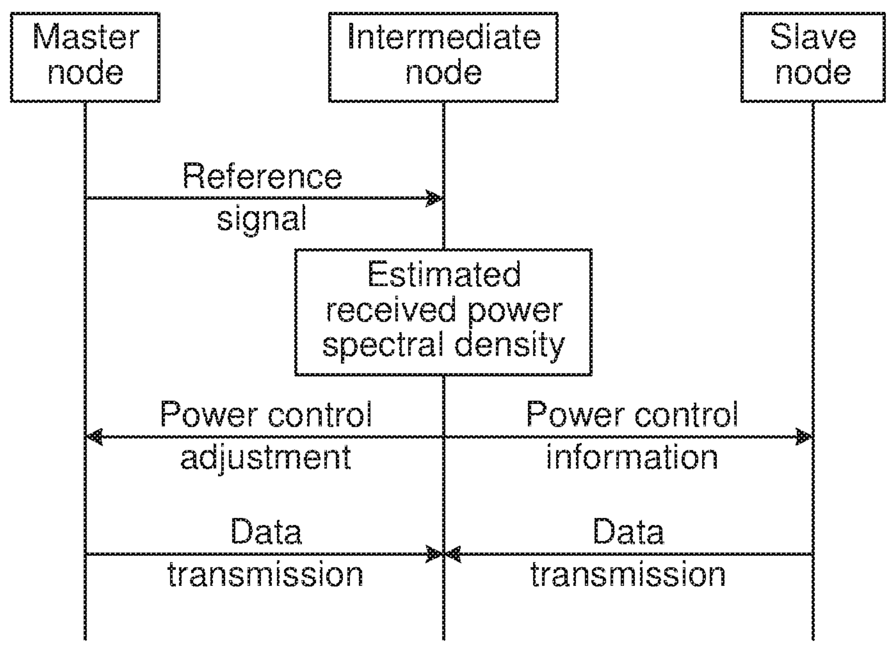
FIG. 4 is a schematic diagram illustrating signaling between nodes in a wireless network.

Signaling in a wireless network is illustrated in FIG. 4. The second node 3 sends a reference signal, such as CRS, to the first node 2. The first node 2 uses the reference signal to measure the received power and to then estimate the received power spectral density, which is used to determine a target received power spectral density. The first node 2 then sends power control information, such as a $P_{O\_PUSCH}$ parameter configuration or TPC commands, to the third node 1. The power control information may specify a set-point value in terms of the determined received power spectral density. The third node 1 and the second node 3 can then send data transmissions to the first node 2 being received simultaneously, i.e. within the same TTI.

For a variant wherein the second node 3 allows power control adjustment, such as a recommendation of reducing the power within on offset value, to be sent from the first node 2, this may be sent in parallel to the power control information sent to the third node 1. it may be useful to e.g. adjust the transmit power from the second node 3 when a third node 1 does not have the capacity to transmit at the target transmit power $P_C$, e.g. due to maximum transmission power constraints. The determined target received power spectral density may then be set to a lower value than indicated by the reference signal. The power control adjustment may alternatively be sent after the power control information has been sent to the third node 1, e.g. due to later indication that the third node 1 does not have the capacity to transmit at the target transmit power. The indication may e.g. be obtained by a measurement in the first node 2, or by receiving a so-called power headroom report from a third node 1. Further, the second node 3 may in a variation delegate power control to the first node 2, and thus act as a slave node to the first node 2. The second node 3 may have a formula controlling its power but may also operate without an explicit formula specified. The second node 3 may also receive a recommendation (with or without a formula) for increasing/decreasing the power and choose whether to follow the recommendation or not.

A power control adjustment signal may also be send to the third node 1. This may be used e.g. for a temporary adjustment of the target received power spectral density.

After a target received power spectral density is determined, the first node 2 may send a power control adjustment signal to the third node 1. The power control adjustment signal may be a recommendation from the first node 2. The third node 1 may then adjust the transmit power according to this target. The power control adjustments may be similar to the uplink closed loop power control, which is determined by $$P_{AB1}(i)=\min\{P_{CMAX},\ 10\ \log_{10}(M_{AB1}(i))+P_{O\_AB1}(j)+\alpha(j)\cdot PL_{AB}+\Delta_{AB1}(i)+f_1(i)\}$$

where $P_{CMAX}$ is the configured maximum transmit power, $M_{AB}(i)$ is the number of resource blocks transmitted by third node 1 (A) to first node 2 (B), $P_{O\_AB}(j)$ is the power target for transmissions from third node 1 (A) to first node 2 (B), a is an optional parameter configured by higher layers (also known as fractional path loss compensation factor), $PL_{AB}$ is the path loss estimate for the link from third node 1 (A) to first node 2 (B), $\Delta_{AB}(i)$ is an optional link-specific parameter provided by higher layers and $f_1(i)$ is a link-specific correction term controlled by transmit power control, TPC, commands sent in feedback information.

In a variant, where first node 2 evaluates the target received power spectral density and sends adjustments $f_{AB2}(i)$ to third node 1 regularly, the power target:

$$P_{O\_AB2}(i)=P_{O\_AB2}(i-1)+f_{AB2}(i)$$

may be used in power control by third node 1, according to the following rule:

$$p_{AB2}(i)=\min\{P_{CMAX},10\ \log_{10}(M_{AB}(i)+P_{O\_AB2}(j)\}$$

This then enables that the first node 2 can receive DL transmissions from the second node 3 in the same TTI as it receives UL transmissions from the third nodes 1. All third nodes will then typically reach the received power target, if the first node 2 sets a suitable received power target. It will however not always be possible for the second node 1 to adapt transmit power according to the power control adjustment, e.g. a LTE Macro node is typically operating at a fixed transmit power when cell-specific reference signals, CRS, are used as DL demodulation reference.

The recommended power control adjustment signal sent to the second node 3 may be associated with specified future TTIs, wherein the first node 2 allows reception of UL transmissions from its third nodes 1. In other TTIs the second node 3 can use a transmit power as described above. Correspondingly, the power control adjustment signal sent to the third node 1 may be associated with specified future TTIs, wherein the first node 2 receives reception of DL transmissions from its second node 3. In other Ms the third node 1 can use a transmit power as described above.

In a coordinated multi-point operation mode in the wireless network, the power control adjustment may be an adjustment range wherein the range indicates that second node 3 can dynamically adapt its transmit power within a range of transmit powers.

Figure 5A:
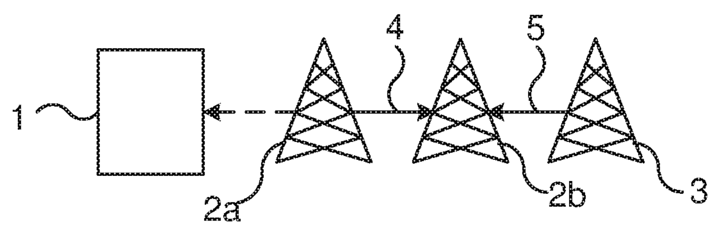
FIGS. 5A and 5B are schematic diagrams illustrating an embodiment presented herein.
Figure 5B:
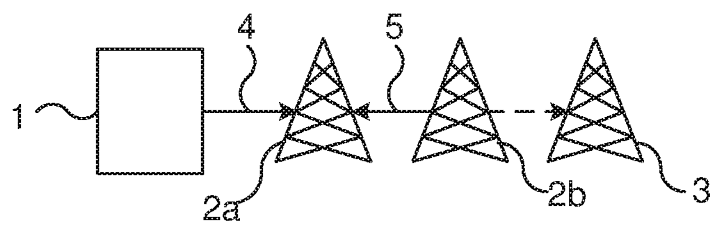

A sequential implementation of a wireless network is illustrated in FIGS. 5A and 5B. Multiple first nodes 2A and 2B deployed in series, is presented, enabling both UL and DL in each first node for a TTI, independently of each other. In FIG. 5A first node 2B acts as a slave for second node 3 and as a master for first node 2A, providing similar received power spectral densities for first node 2B, and thus the possibility for e.g. full duplex over this node. In FIG. 5B first node 2A acts as a slave for first node 2B and as a master for third node 1, providing received power spectral densities for first node 2A, and thus the possibility for e.g. full duplex over this node.

The presented power control is independent of how the UL and DL are multiplexed in a receiver. The UL and DL links may be in different frequency resources, spatially multiplexed, or code multiplexed. The main difference between these examples is however the sensitivity to power offset between the UL and DL links. Frequency multiplexing is the least sensitive to power offset and code multiplexing is often the most sensitive to power offset.

The first node 2 may receive data transmissions from both the second node 3 and the third node 1 within the same TTL allowing full-duplex for the wireless network. However, the third node i may also start in a half-duplex mode and enter a full-duplex mode after receipt of the target received power spectral density.

When the first node 2 has a plurality of third nodes 1, different third nodes 1 may provide different power outputs even if the same setpoint value is transmitted to all third nodes 1 to the first node 2.

Figure 6:
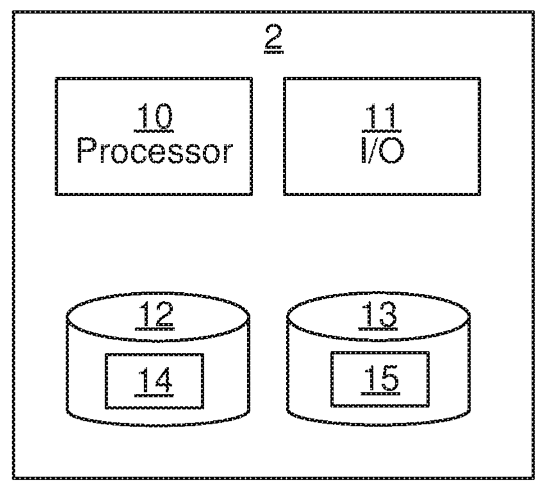
FIG. 6 is a schematic diagram illustrating some components of a network node.

FIG. 6 is a schematic diagram showing some components of the network node 2. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 7A-7C.

The memory may he any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor in. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the network node 2.

The network node 2 may further comprise an input/output, I/O, interface 11 including e.g. a user interface. The network node may further comprise a receiver configured to receive signaling from a second node and/or from a third node, and a transmitter configured to transmit signaling to the second node and/or to the third node (not illustrated). Other components of the network device are omitted in order not to obscure the concepts presented herein.

A network node 2; 2*a*, 2*b* for power control in a wireless network is presented, wherein the network node acts as an intermediate node in a wireless network. The network node 2; 2*a*, 2*b* comprises: a processor lo; and a computer program product 12, 13 storing instructions that, when executed by the processor cause the network node 2; 2*a*, 2*b* to: estimate 73 a received power spectral density 5 from a second node 3 in the wireless network; determine 74 a target received power spectral density 4 from a third node 1 in the wireless network, in dependence of the estimated received power spectral density 5; and send 77 power control information to the third node in dependence on the determined target received power spectral density 4.

A User Equipment, UE, for power control in a wireless network is presented, wherein the UE is acting as a first node in a wireless network. The UE 2; 2*a*, 2*b* comprises: a processor 10; and a computer program product 12,13 storing instructions that, when executed by the processor 10, causes the LIE 2; 2*a*, 2*b* to: estimate 73 a received power spectral density 5 from a second node 3 in the wireless network; determine 75 a target received power spectral density 4 from a third node 1 in the wireless network, in dependence of the estimated received power spectral density 5; and send 77 power control information to the third node in dependence on the determined target received power spectral density 4.

Figure 7A:
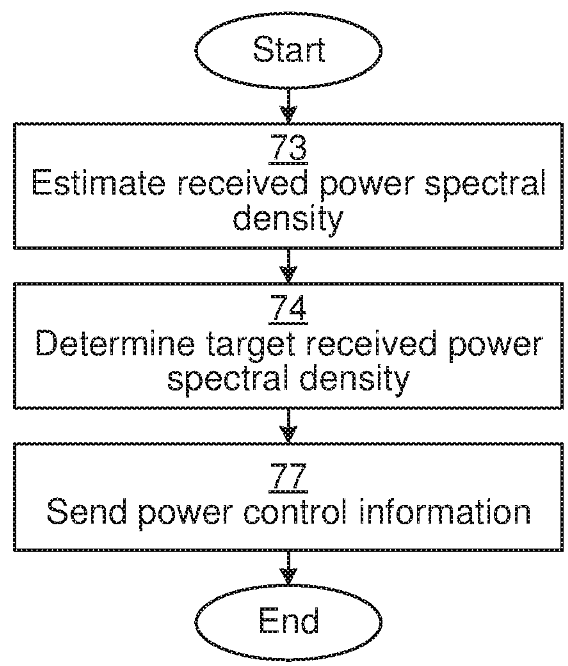
FIGS. 7A-7C are flow charts illustrating methods for embodiments presented herein.
Figure 7B:
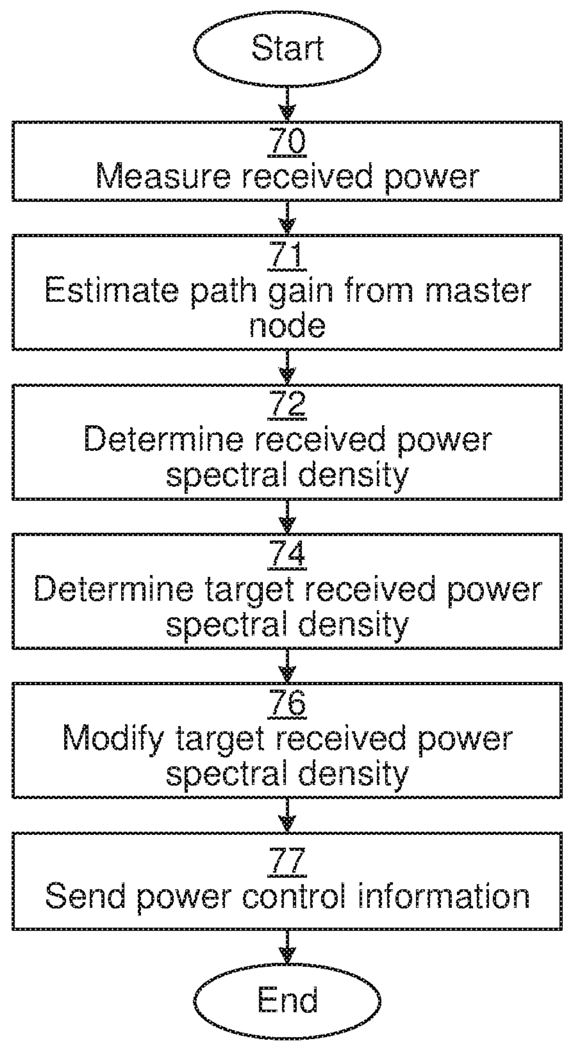
Figure 7C:
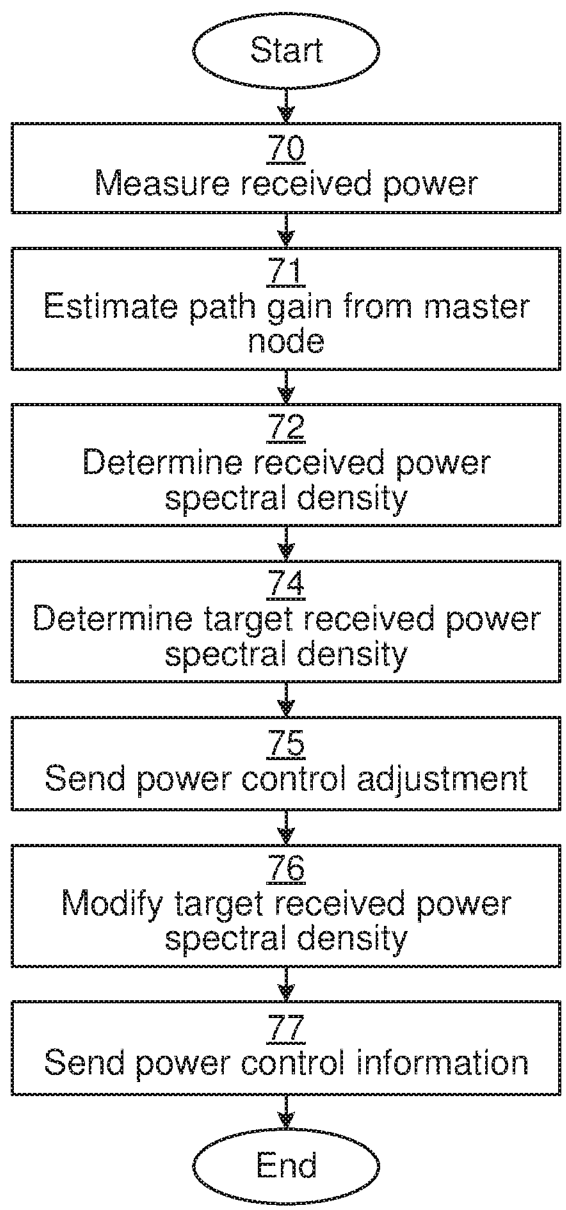

A method, according to an embodiment, for power control in a wireless network, is presented with reference to FIGS. 7A-7C, which method is performed in a first node 2, 2A or 2B. The method comprises, which is illustrated in FIG. 7A, the steps of estimating 73 a received power spectral density 5 from a second node 3 in the wireless network; determining 74 a target received power spectral density 4 from a third node 1 in the wireless network, in dependence of the estimated received power spectral density 5; and sending 77 power control information to the third node in dependence on the determined target received power spectral density 4.

The step of estimating a received power spectral density may, which is illustrated in FIG. 7B, comprise the steps of: measuring 70 a received power from the second node, estimating 71 a path gain between the second node and the first node, and determining 72 a received power spectral density 5 from the second node in dependence of the measured received power, the estimated path gain and a bandwidth.

The step of determining 74 a second received power spectral density may set the target received power spectral density to the estimated received power spectral density within thresholds, wherein the thresholds may be set in dependence of processing capabilities of the first node.

A step of sending 75 power control adjustment information to the second node, may further be included in the method. The method may be performed for a Transmission Time Interval, TTI, and the step of sending 77 may be performed via a broadcast message. The power control information may further specify a setpoint value in terms of the determined target received power spectral density.

The method may further, which is illustrated in FIG. 7C, comprise a further step of modifying 76 the determined target received power spectral density, and wherein power control information is in dependence on the modified determined target received power spectral density.

Figure 8:
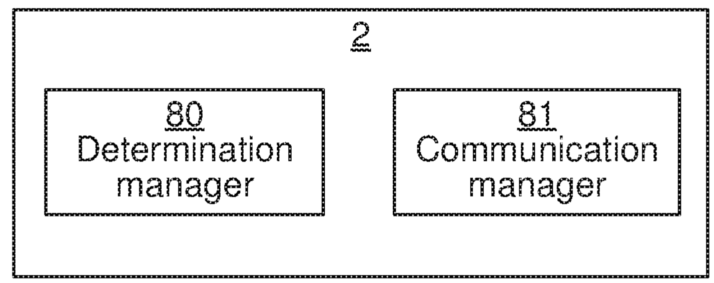
FIG. 8 is a schematic diagram showing functional modules of a network node.

FIG. 8 is a schematic diagram showing functional blocks of the first node 2 or the UE 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 7A-7C, comprising a determination manager unit 80, and a communication manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 100 is for determining target received power spectral density. This module corresponds to the measure received power step 70 of FIGS. 7B-7C, the step of estimate path gain from the second node step 71 of FIGS. 7B-7C, the determine received power spectral density step 72 of FIGS. 7B-7C, the estimate received power spectral density step 73 of FIG. 7A, the determine target received power spectral density step 74 of FIGS. 713-7C, and the modify target received power spectral density step 76 of FIGS. 7B-7C. This module can e.g. be implemented by the processor 10 of FIG. 6, when running the computer program.

The communication manger 81 is for controlling wireless communication with the second node 3 and the third nodes 1. This module corresponds to the send power control adjustment step 75 of FIG. 7C, and the send power control information step 77 of FIGS. 7B-7C. This module can e.g. be implemented by the processor 10 of FIG. 6, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for power control in a wireless network, the method being performed in a first node in the wireless network and comprising the steps of:

estimating a received power spectral density from a second node in the wireless network;

determining a target received power spectral density from a third node in the wireless network, based on the estimated received power spectral density; and sending power control information to the third node, based on the determined target received power spectral density.

2. The method of claim 1, wherein the step of estimating a received power spectral density includes the steps of measuring a received power from the second node, estimating a path gain between the second node and the first node, and determining a received power spectral density from the second node based on the measured received power, the estimated path gain and a band-width.

3. The method of claim 1, wherein the step of determining the target received power spectral density sets the target received power spectral density to the estimated received power spectral density within thresholds.

4. The method of claim 3, wherein the thresholds are set based on processing capabilities of the first node.

5. The method of claim 1, comprising a further step of modifying the determined target received power spectral density, and wherein power control information is based on the modified determined target received power spectral density.

6. The method of claim 1, comprising a further step of sending power control adjustment information to the second node and/or to the third node.

7. The method of claim 1, wherein the method is performed for a Transmission Time Interval (TTI).

8. The method of claim 1, wherein the step of sending is performed via a broadcast message.

9. The method of claim 1, wherein the power control in-formation specifies a setpoint value in terms of the determined target received power spectral density.

10. A network node for power control in a wireless network, the network node being a first node in the wireless network, the network node comprising:

a processor; and a computer program product storing instructions that, when executed by the processor, causes the network node to:

estimate a received power spectral density from a second node in the wireless network;

determine a target received power spectral density from a third node in the wireless network, based on the estimated received power spectral density; and send power control information to the third node, based on the determined target received power spectral density.

11. The network node of claim 10, wherein the instructions are configured to cause the network node to perform the estimating by measuring a received power from the second node, estimating a path gain between the second node and the first node, and determining a received power spectral density from the second node, based on the measured received power, the estimated path gain and a bandwidth.

12. The network node of claim 10, wherein the instructions are configured to cause the network node to perform the determining by setting the target received power spectral density to the estimated first received power spectral density within thresholds.

13. The network node of claim 12, wherein the thresholds are set based on processing capabilities of the first node.

14. The network node of claim 10, comprising a further instruction causing the network node to modify the determined target received power spectral density, and wherein power control information is based on the modified determined second received power spectral density.

15. The network node of claim 10, comprising a further instruction causing the network node to send power control adjustment information to the second node and/or to the third node.

16. The network node of claim 10, wherein the instructions are configured to be performed for a Transmission Time Interval (TTI).

17. The network node of claim 10, wherein the instructions are configured to cause the network node to perform the sending via a broadcast message.

18. The network node of claim 10, wherein the power control information specifies a setpoint value in terms of the determined target received power spectral density.

19. A User Equipment (UE) for power control in a wireless network, the UE being a first node in the wireless network, the UE comprising:

a processor; and a computer program product storing instructions that, when executed by the processor, causes the UE to:

estimate a received power spectral density from a second node in the wireless network;

determine a target received power spectral density from a third node in the wireless network, in dependence of the estimated received power spectral density; and send power control information to the third node, based on the determined target received power spectral density.

20. A non-transitory computer-readable medium comprising, stored thereupon, a computer program for power control in a wireless network, the computer program comprising computer program code configured so that, when the computer program code is run on a processor of a first network node in the wireless network, the computer program code causes the first network node to:

estimate a received power spectral density from a second node in the wireless network;

determine a target received power spectral density from a third node in the wireless network, based on the estimated received power spectral density; and send power control information to the third node, based on the determined target received power spectral density.

* * * * *